(12) United States Patent
Dewberry et al.

(10) Patent No.: US 9,140,772 B1
(45) Date of Patent: Sep. 22, 2015

(54) DISTANCE MEASURING QUALITY FACTOR USING SIGNAL CHARACTERIZATION

(71) Applicant: TDC Acquisition Holdings, Inc, Huntsville, AL (US)

(72) Inventors: Brandon Scott Dewberry, Huntsville, AL (US); William Clyde Beeler, Harvest, AL (US)

(73) Assignee: TDC Acquisition Holdings, Inc., Huntsville, AL (US)

( * ) Notice: Subject to any disclaimer, the term of this patent is extended or adjusted under 35 U.S.C. 154(b) by 324 days.

(21) Appl. No.: 13/745,700

(22) Filed: Jan. 18, 2013

Related U.S. Application Data

(60) Provisional application No. 61/587,912, filed on Jan. 18, 2012.

(51) Int. Cl.
| | | |
|---|---|---|
| *G01S 13/08* | (2006.01) | |
| *G01S 3/04* | (2006.01) | |
| *H04B 1/7183* | (2011.01) | |
| *G01S 13/76* | (2006.01) | |
| *G01S 13/02* | (2006.01) | |

(52) U.S. Cl.
CPC .............. *G01S 3/04* (2013.01); *G01S 13/0209* (2013.01); *G01S 13/76* (2013.01); *H04B 1/7183* (2013.01)

(58) Field of Classification Search
CPC ... H04B 1/7183; G01S 13/0209; G01S 13/76; G01S 3/04
USPC .............. 342/27, 28, 118, 134, 143, 387, 458
See application file for complete search history.

(56) References Cited

U.S. PATENT DOCUMENTS

| | | | |
|---|---|---|---|
| 4,641,317 A | 2/1987 | Fullerton | |
| 4,813,057 A | 3/1989 | Fullerton | |
| 4,979,186 A | 12/1990 | Fullerton | |
| 5,363,108 A | 11/1994 | Fullerton | |
| 5,677,927 A | 10/1997 | Fullerton et al. | |
| 5,687,169 A | 11/1997 | Fullerton et al. | |
| 5,764,696 A | 6/1998 | Fullerton et al. | |
| 5,812,081 A | 9/1998 | Fullerton | |
| 5,832,035 A | 11/1998 | Fullerton et al. | |
| 5,952,956 A | 9/1999 | Fullerton | |
| 5,969,663 A | 10/1999 | Fullerton et al. | |
| 6,111,536 A | 8/2000 | Richards et al. | |
| 6,133,876 A * | 10/2000 | Fullerton et al. | 342/375 |
| 6,177,903 B1 | 1/2001 | Fullerton et al. | |
| 6,295,019 B1 | 9/2001 | Richards et al. | |
| 6,300,903 B1 | 10/2001 | Richards et al. | |

(Continued)

*Primary Examiner* — John B Sotomayor
*Assistant Examiner* — Marcus Windrich
(74) *Attorney, Agent, or Firm* — James Richards

(57) ABSTRACT

A system and method for providing a range (distance) measurement by measuring electromagnetic signal time of flight. The system provides an estimate of the quality of the range measurement by evaluation of the multipath environment based on signal characterization. In one embodiment, a received ultra wideband signal is evaluated by a scanning receiver to produce a channel scan waveform inclusive of the transmitted signal and multipath response. The channel scan waveform is evaluated for envelope rise rate, amplitude, leading edge direct path pulse time, saturation, blockage, and signal history characterization. Signal characteristics are used to determine a signal classification. Signals are then evaluated for quality based on the signal classification. In one embodiment, the signal quality is used to estimate a variance of the range estimate for use in navigation algorithms.

11 Claims, 13 Drawing Sheets

(56) References Cited

U.S. PATENT DOCUMENTS

| | | | |
|---|---|---|---|
| 6,304,623 B1 | 10/2001 | Richards et al. | |
| 6,421,389 B1 | 7/2002 | Jett et al. | |
| 6,483,461 B1 | 11/2002 | Matheney et al. | |
| 6,492,904 B2 | 12/2002 | Richards | |
| 6,501,393 B1 | 12/2002 | Richards et al. | |
| 6,556,621 B1 * | 4/2003 | Richards et al. | 375/150 |
| 6,571,089 B1 | 5/2003 | Richards et al. | |
| 6,577,691 B2 | 6/2003 | Richards et al. | |
| 6,614,384 B2 | 9/2003 | Hall et al. | |
| 6,700,538 B1 | 3/2004 | Richards | |
| 6,717,992 B2 | 4/2004 | Cowie et al. | |
| 6,748,040 B1 | 6/2004 | Johnson et al. | |
| 6,788,730 B1 | 9/2004 | Richards et al. | |
| 6,906,625 B1 | 6/2005 | Taylor et al. | |
| 6,959,031 B2 | 10/2005 | Haynes et al. | |
| 6,963,727 B2 * | 11/2005 | Shreve | 455/39 |
| 7,230,980 B2 | 6/2007 | Langford et al. | |
| 7,304,609 B2 * | 12/2007 | Roberts | 342/387 |
| 7,426,233 B2 | 9/2008 | Richards et al. | |
| 7,436,876 B2 | 10/2008 | Fisher et al. | |
| 7,649,925 B2 | 1/2010 | Fullerton et al. | |
| 8,111,797 B2 * | 2/2012 | Barnes et al. | 375/369 |
| 8,521,091 B2 * | 8/2013 | Miscopein et al. | 455/67.11 |
| 8,552,903 B2 * | 10/2013 | Julian et al. | 342/43 |
| 8,886,125 B2 * | 11/2014 | Agrawal et al. | 455/41.3 |
| 2004/0066332 A1 * | 4/2004 | Tsunehara et al. | 342/458 |
| 2007/0285306 A1 * | 12/2007 | Julian et al. | 342/118 |
| 2010/0073229 A1 * | 3/2010 | Pattabiraman et al. | 342/357.09 |
| 2011/0292820 A1 * | 12/2011 | Ekbal et al. | 370/252 |
| 2011/0316747 A1 * | 12/2011 | Budianu et al. | 342/387 |

\* cited by examiner

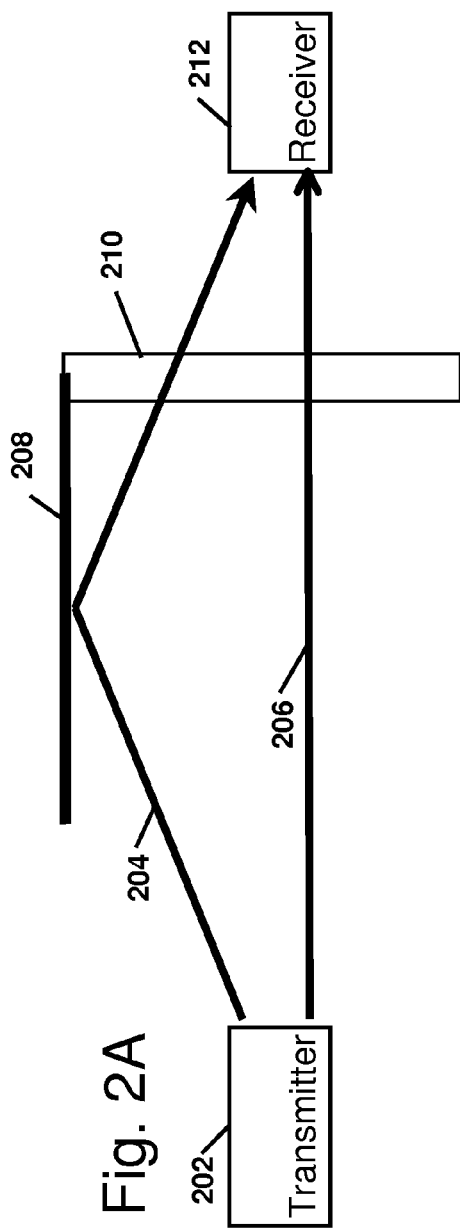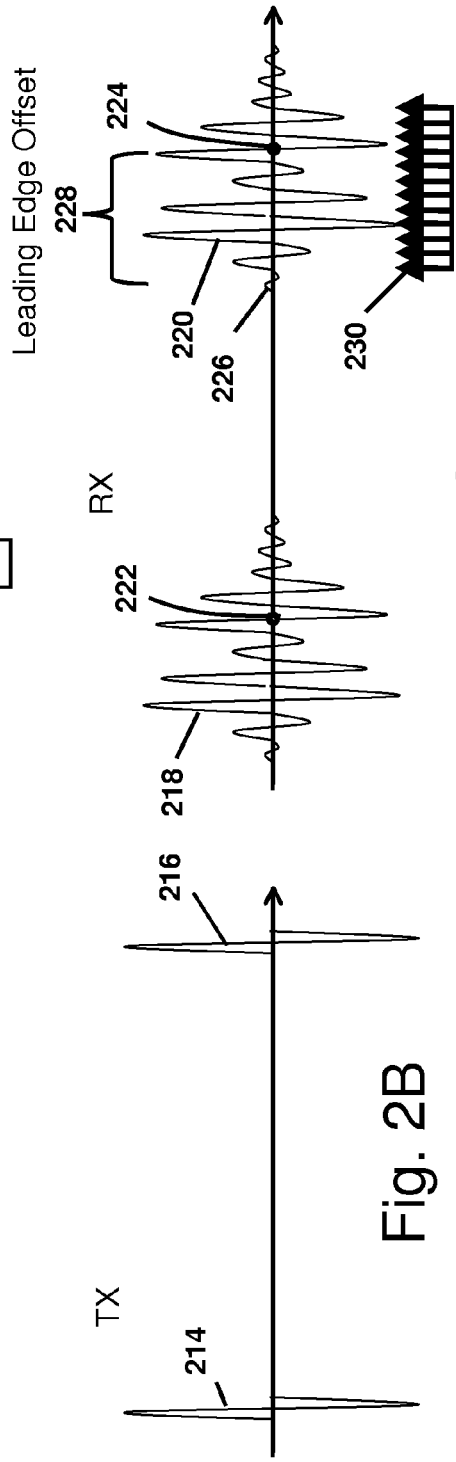

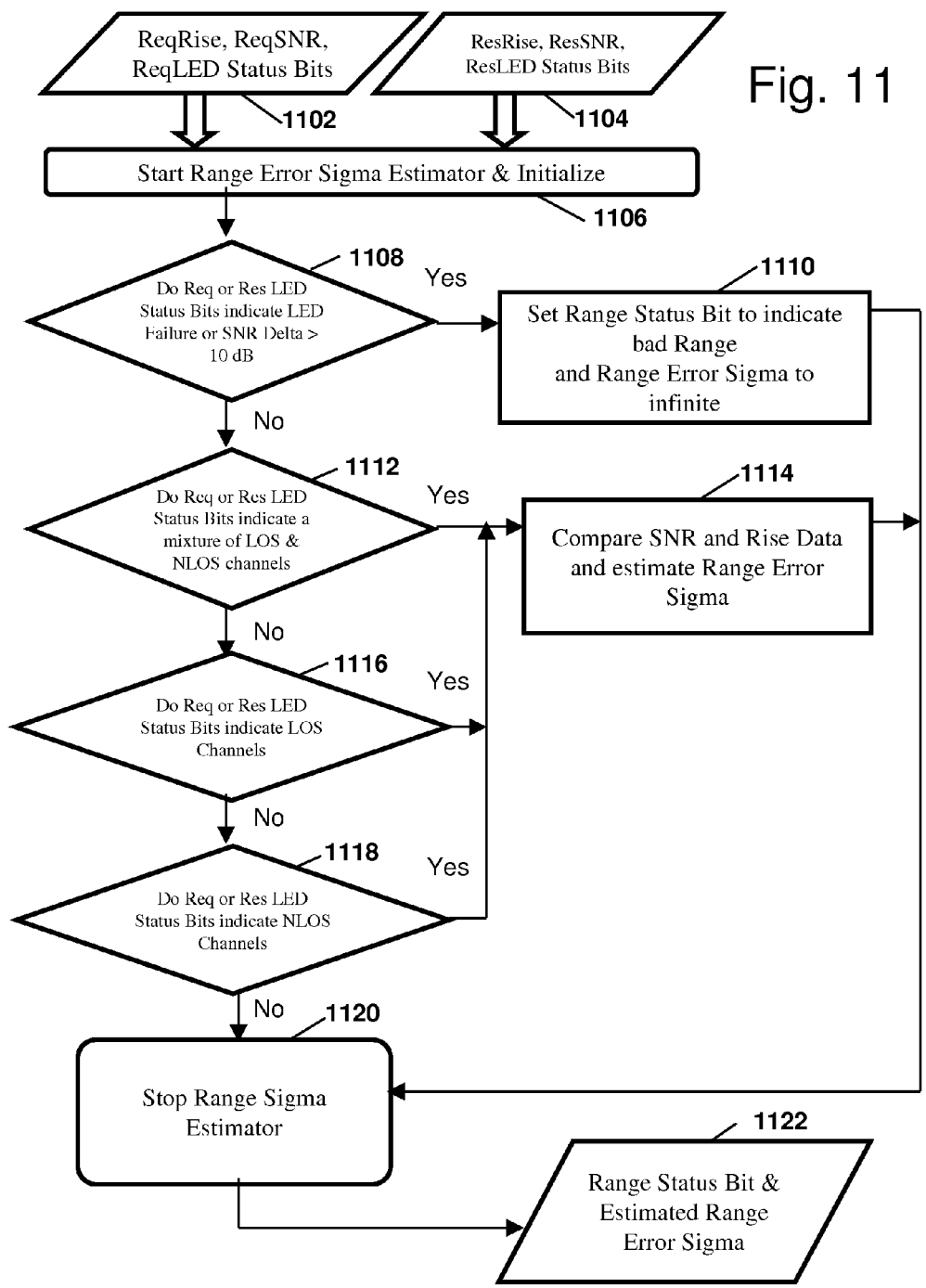

_US 9,140,772 B1_

DISTANCE MEASURING QUALITY FACTOR USING SIGNAL CHARACTERIZATION

RELATED APPLICATIONS

This application is a non-provisional claiming the benefit under 35 USC 119(e) of provisional application 61/587,912 titled "Distance Measuring Error Variance Using Signal Characterization", filed Jan. 18, 2012 by Dewberry et al; which is incorporated herein in its entirety.

TECHNICAL FIELD

The present invention pertains generally to the field of distance measuring using electromagnetic signals, more particularly, to the determination of measurement quality associated with a distance measurement.

BACKGROUND

Ultrawideband ranging has been found to be valuable aiding source for indoor and GPS compromised personal inertial-based navigation (Huseth, Dewberry, & McCrosky, "Pulsed-RF Ultrawideband Ranging for the GLANSER GPS-Denied Emergency Responder Navigation System," Proceedings of ION ITM 2011, Jan. 24-26, 2011, San Diego, Calif.) The inventors observe that these GPS/IMU/UWB navigation systems typically utilize an optimal non-linear filter, mixing multiple aiding sources to produce their final navigation solution. These filters rely on a fixed estimate of range measurement variation ("range noise") inherent in the UWB ranging sensor. The fixed estimate is usually a conservative estimate representing an unusually large error, which consequently results in an underperforming system most of the time, particularly when the error is in fact much less than the estimate.

Thus, the inventors observe a need for improving the performance of navigation systems relying on UWB distance measurements.

BRIEF DESCRIPTION

The present invention relates to a system and method for providing a range measurement by measuring electromagnetic signal time of flight. The system and method provides an estimate of the quality of the range measurement by evaluation of the multipath environment based on signal characterization. In one embodiment, a received ultra wideband signal is evaluated by a scanning receiver to produce a channel scan waveform inclusive of the transmitted signal and multipath response. The channel scan waveform is evaluated for envelope rise rate, amplitude, leading edge direct path pulse time, saturation, blockage, and signal history characterization. Signal characteristics are used to determine a signal classification. Signals are then evaluated for quality based on the signal classification. In one embodiment, quality may comprise valid or invalid. In one embodiment, the signal quality may be used to estimate a variance of the range estimate for use in navigation algorithms.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 2A illustrates an exemplary UWB link from transmitter to receiver.

FIG. 2B and FIG. 2C depict exemplary transmitted and received pulses.

FIG. 11 is a block diagram of an exemplary error sigma process in accordance with the present invention.

DETAILED DESCRIPTION

UWB Basics

Figure 1B:
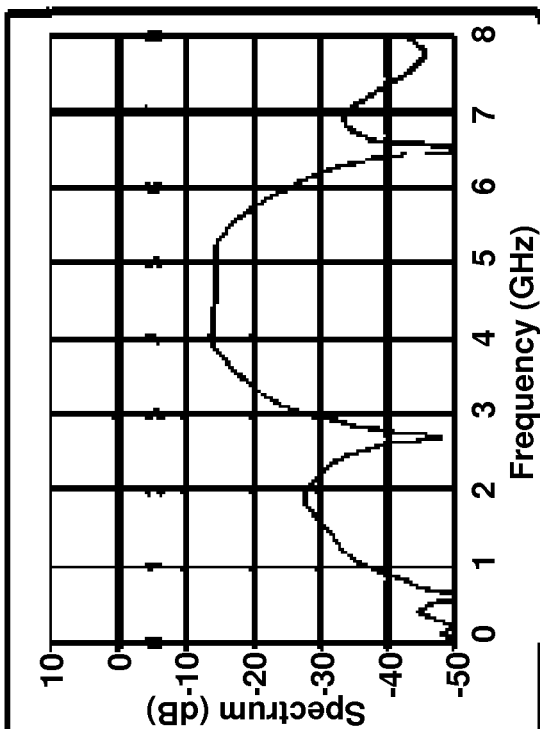
FIG. 1B illustrates the spectrum of the pulse waveform of FIG. 1A.

The following is an overview of impulse radio as an aid in understanding the benefits of the present invention.

Ultra Wideband is an emerging RF technology with significant benefits in communications, radar, positioning and sensing applications. In 2002, the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 400 MHz bandwidth at any center frequency. The fractional bandwidth is more precisely defined as:

$$FBW = \frac{2(f_h - f_l)}{f_h + f_l},$$

where FBW is the fractional bandwidth, $f_h$ is the upper band edge and $f_l$ is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present invention has its origin in ultra wideband impulse radio and will have significant application there, but it has potential benefit and application beyond impulse radio to other forms of ultra wideband and beyond ultra wideband to conventional radio systems as well. Nonetheless, it is useful to describe the invention in relation to impulse radio to understand the basics and then expand the description to the extensions of the technology.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al., and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array", U.S. Pat. No. 6,218,979 (issued Apr. 17, 2001) titled "Wide Area Time Domain Radar Array", and U.S. Pat. No. 6,614,384 (issued Sep. 2, 2003), which are incorporated herein by reference.

Additional details on pulser circuits may be found in U.S. patent application Ser. No. 09/537,692 Titled: "Apparatus, System and Method for Flip Modulation in an Impulse Radio Communications System," filed Mar. 29, 2000, by Fullerton et al., and application Ser. No. 10/712,271 titled: "A Bi-Phase Modulator for Ultra Wideband Signals", filed Sep. 30, 2004, by Fitzpatrick et al., which are incorporated herein by reference.

Additional details on receiver circuits may be found in U.S. Pat. No. 6,421,389 titled "Baseband Signal Converter Device for a Wideband Impulse Radio Receiver" issued Jul. 16, 2002 to Jett et al. Further UWB power saving techniques may be found in U.S. Pat. No. 6,492,904 titled "Method and system for coordinating timing among ultrawideband transmissions" issued Dec. 10, 2002 to Richards, and U.S. Pat. No. 6,571,089 titled: "Method and apparatus for moderating interference while effecting impulse radio wireless control of equipment," issued May 27, 2003 to Richards et al. and U.S. patent application titled: "System And Method For Processing Signals In UWB Communications," Ser. No. 10/712,269, filed on 14 Nov. 2003 by Brethour et al. All of the above cited U.S. patents and U.S. patent applications are hereby incorporated herein by reference in their entirety.

Timing coordination among UWB transmissions is further described in U.S. Pat. No. 6,492,904, titled: "Method and System for Coordinating Timing Among Ultrawideband Transmissions," issued Dec. 10, 2002 to Richards. Security systems utilizing timing are further described in U.S. Pat. No. 6,614,384, titled: "System and Method for Detecting an Intruder Using Impulse Radio Technology," issued Sep. 2, 2003 to Hall et al. and U.S. Pat. No. 6,177,903, titled: "System and Method for Intrusion Detection Using a Time Domain Radar Array," issued Jan. 23, 2001 to Fullerton et al. Object position location is further explained in U.S. Pat. No. 6,300,903, titled: "System and Method for Person or Object Position Location Utilizing Impulse Radio," issued Oct. 9, 2001, to Richards et al. Position determination is further explained in U.S. Pat. No. 6,133,876, titled: "System and Method for Position Determination by Impulse Radio," issued Oct. 17, 2000 to Fullerton et al. Functional control based on position information is further described in U.S. patent application Ser. No. 09/511,991, titled "System and Method for Information Assimilation and Functionality Control Based on Positioning Information Obtained by Impulse Radio Techniques," filed Feb. 24, 2000 by Taylor et al. Delay coding techniques are further described in U.S. patent application Ser. No. 09/878,923, titled: "System and Method for Applying Delay Codes to Pulse Train Signals," filed Jun. 13, 2001 by Roberts and U.S. Pat. No. 6,878,730 titled "Method and apparatus for applying codes having pre-defined properties," issued Sep. 7, 2004 to Richards et al. The above listed U.S. patents and U.S. patent applications are hereby incorporated herein by reference in their entirety.

Distance measurement is further described in U.S. Pat. No. 6,133,876 Titled: "System and Method for Position Determination By Impulse Radio," issued Oct. 17, 2000 to Fullerton et al, and U.S. Pat. No. 6,295,019 Titled: "System and Method for Distance Measurement by Inphase and Quadrature Signals in a Radio System" issued Sep. 25, 2001 to Richards et al. Full duplex communications is further described in U.S. Pat. No. 5,687,169, titled "Full Duplex Ultrawide-Band Communication System and Method," issued Nov. 11, 1997 to Fullerton. Precision timing generators are further described in U.S. Pat. No. 6,304,623 titled "Precision Timing Generator System and Method," issued Oct. 16, 2001 to Richards et al., and U.S. Pat. No. 6,577,691 titled "Precision timing generator apparatus and associated methods," issued Jun. 10, 2003 to Richards et al.

Acquisition is further described in U.S. Pat. No. 6,556,621 titled "System for Fast Lock and Acquisition of Ultra-Wideband Signals," issued Apr. 29, 2003 to Richards et al.

All of the above mentioned U.S. patents and patent applications are hereby incorporated herein by reference in their entirety.

Distance Measurement

In one embodiment of the invention, range measurements may be delivered to a navigation process. The navigation process may combine multiple measurement sources into a navigation solution using filters and techniques such as Kalman filtering. In typical Kalman filtering solutions, it is useful to have an estimate of the quality of a given input measurement. In particular, it is useful to determine a statistical variance for the measurement. Often in practical implementations, a constant estimated variance is assumed for the measurements in the absence of any better information. The resulting sub-optimal performance is thus accepted as best available. The present invention enables determination of at least a quality factor and often determination of a variance on the range estimate based on multi-parameter received waveform characterization and classification.

In a first prototype system the navigation algorithm used a constant UWB range noise factor picked as a conservative estimate of the error measured during offline outdoor-indoor static waypoint tests over many propagation environments. This worst-case range error was then tuned as needed during many iterations of test and rework to balance its effects against other sensor and motion model errors in the algorithm. UWB range error estimates of up to one meter were used to guard against the occasional one meter outlier throwing the navigator off course.

However, quite often the UWB ranging transceiver, when not subjected to maximum distance through worst-case multipath and direct blockage, consistently produces range measurements with standard deviations less than 6 cm. The pulse waveform scan measured by the UWB transceiver as a by-product of multipath-resistant time of flight ranging conveys a clear visual indication of a clean signal with low direct-path offset variance.

One aspect of the invention includes utilization of a direct scan waveform provided by a UWB scanning transceiver to estimate a robust range error estimate, useful for integration into higher-order navigation algorithms. By providing an accurate and robust range noise estimate with each range measurement the UWB transceiver enables the navigation algorithm to take advantage of the high accuracy of pristine measurements when line-of-sight urban or indoor, as well as moderately compromised through-wall measurements, and possibly ignoring or automatically de-rating measurements with very large range errors due to complete blockage of the direct path signal.

One aspect of the invention includes a two-way time-of-flight (TW-TOF) distance measurement capable of operating in high multi path. The distance measurement error is determined using direct sequential coherent scanning of the signal basis. This scanning is typically used to correct for the time-of-arrival of the most direct path rather than simply depending on lock spot time. A byproduct of this direct sequential scanning is a signature of channel response within the bandwidth of the system. The signature includes the effect of the direct path pulse and subsequent reflected pulses.

One aspect of the invention includes pulse scan waveform analysis for accurate estimation of range error. The waveform analysis is based on scanning receiver scan signature analysis of the received pulse waveform. Characteristics determined from the scan signature include, but are not limited to direct-path signal-to-noise, impinging pulse slope, saturation, blockage, nominal, and minimal signal conditions.

Examples of using this novel metric including ranging-only extended Kalman filter (EKF) navigation, GPS/UWB anchor positioning, and direct-path relative signal strength comparison measurements.

Figure 1A:
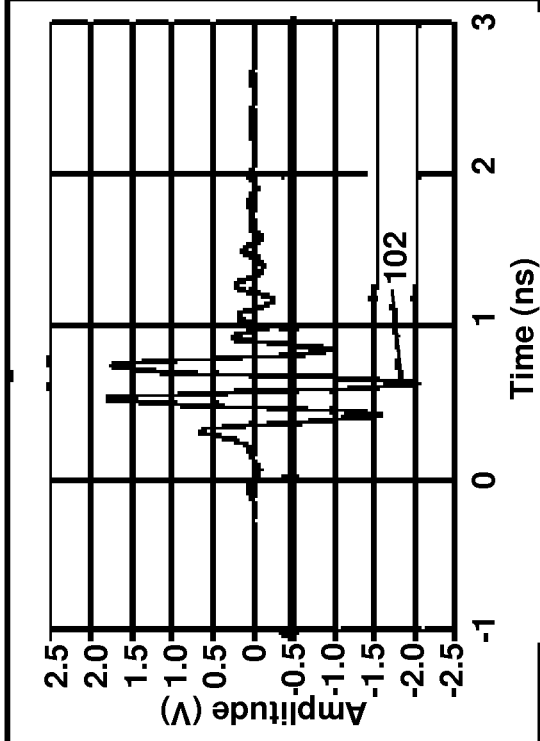
FIG. 1A illustrates an exemplary ultra wideband pulse waveform

FIG. 1A illustrates an exemplary ultra wideband pulse waveform. FIG. 1B illustrates the spectrum of the pulse waveform of FIG. 1A. In one embodiment, a pulse waveform may be used. In alternative embodiments, other waveforms including coded waveforms may be used. The exemplary waveform of FIG. 1A has a pulse envelope substantially contained within one nanosecond. A corresponding spectrum is shown in FIG. 1B having a bandwidth to fit within a 3.1 to 5.3 GHz band. One exemplary embodiment may configurable in output power from 50 microwatts to 3 milliwatts. FIG. 1A shows a peak amplitude of 2 volts at point 102.

FIG. 2A illustrates an exemplary UWB link from transmitter to receiver. The transmitter 202 transmits a packet comprising a sequence of pulses to the receiver 212. The pulses propagate by any number of paths to the receiver, for example, paths 204 and 206. FIG. 2A shows a direct path 206 propagating through a wall 210 and a reflected path 208 reflecting off of a ceiling 208 and then propagating through the wall 210 to the receiver 212. Typically multiple reflected path signals exist resulting in a received signal characterized as a multipath signal.

FIG. 2B and FIG. 2C depict simplified exemplary transmitted and received pulses. FIG. 2B depicts a transmitted signal comprising two simplified pulses 214 and 216 spaced in time. Typically the transmitted signal comprises a lengthy pulse train of many pulses that may be modulated with information and may be organized into packets or other protocols. The exemplary received signal is shown in FIG. 2C comprising two pulses with multiple lobes indicative of multipath reflections arriving at multiple delayed times. Waveform 218 results from pulse 214 and waveform 220 results from pulse 216. In one alternative, a receiver may synchronize receiver timing by locking on the received pulse train waveform. The lock process may focus on a single lock point, for example zero crossings 222 and 224. Once locked, the receiver may scan by sampling or correlating the received signal at delay times before and after the lock point. The resulting scan builds a picture of the received waveform in memory for later analysis. Timing mark sequence 230 depicts offset delay sample timings that may be used to build the waveforms 218 and 220 in memory. The memory picture of the signal may be referred to as a scan. The scan 220 may be used, for example to locate a leading edge 226 and determine a leading edge offset 228. The leading edge is the first detectable signal of the received waveform and is thus the most direct of the signal paths represented. The leading edge offset 228 is the timing offset of the leading edge 226 from the lock point 224.

Figure 3:
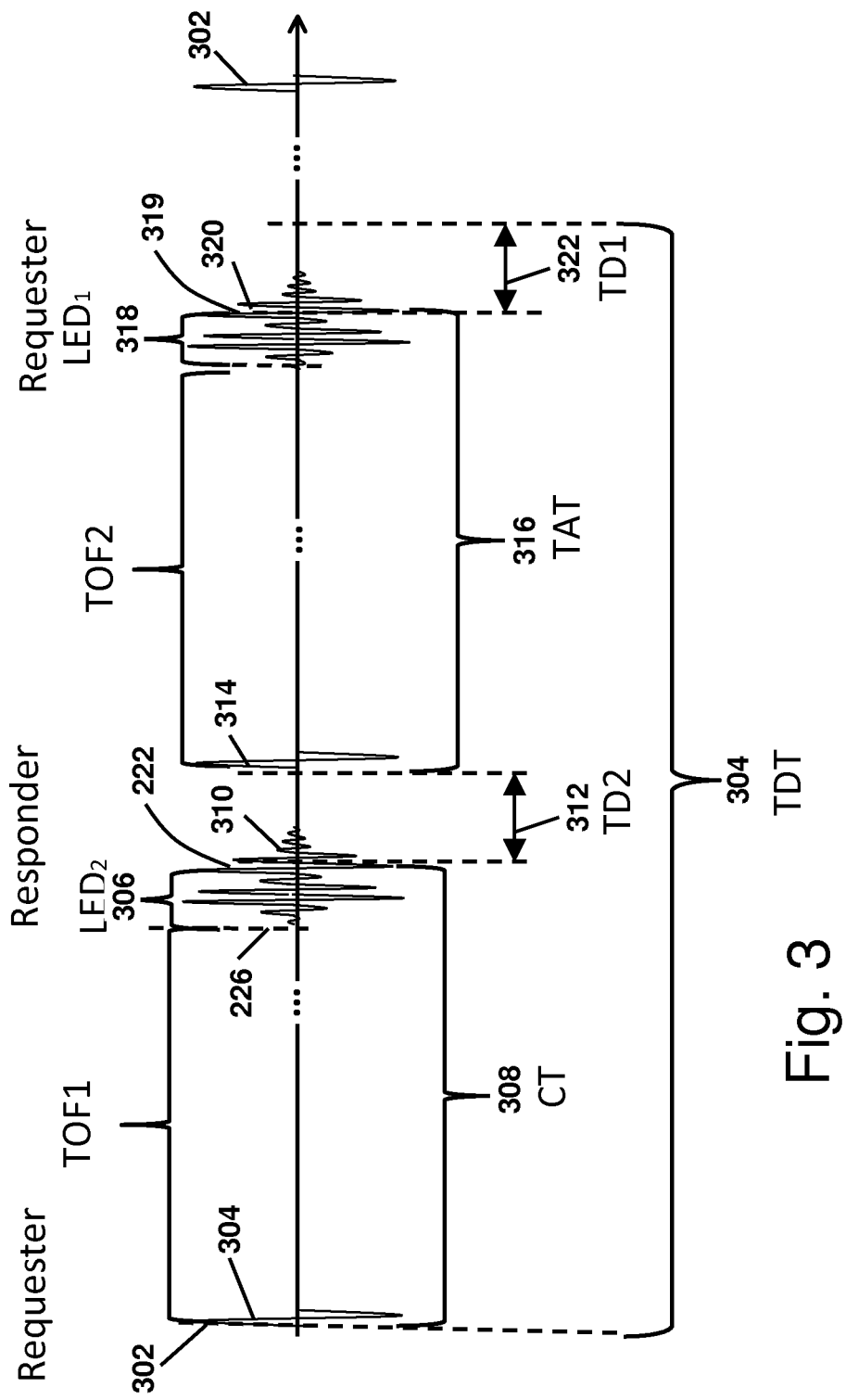
FIG. 3 illustrates the timing for an exemplary two way time of flight measurement.

FIG. 3 depicts the timing for an exemplary two way time of flight measurement. The waveforms depict a ranging communication between a first transceiver TR1 (requester) and a second transceiver TR2 (responder). Referring to FIG. 3, a pulses 302 is sent from TR1 according to a known timing. Pulse 310 is pulse 304 as later received at the receiver of TR2 as modified by the channel and multipath. The receiver TR2 locks and tracks the received pulses according to a reference lock point 222 on the pulse waveform. The receiver determines a leading edge 226 (first pulse time) by analyzing the received pulse signature 310. The leading edge time offset 306 from the lock point is then determined (LED2).

A sequence of return pulses 314 is transmitted from TR2 to TR1 with known time offset 312 from the received lock point 222 to the transmitted pulse train 314, (TD2). TR2 has a known timing relationship between the received signals and transmitted signals within TR2. In one variation, the transmitted signals 314 are synchronous and with a fixed known offset 312 from the received signals. Other measurable and controllable timing relationships may be used. The return pulse 320 is received by TR1 as modified by the channel. Leading edge offset 318 is determined by TR1 (LED1). A further offset 322 accounts for any additional system and cable delays depending on the particular unit. Total delay time (TDT) 304 is the time from the start pulse time 302 to the TR1 receiver lock point 319 as measured in the TR1 transmitter time frame.

The round trip time of flight (TOF) is determined by subtracting all known system delays from the start to finish delay TD1. Since there are two time of flight intervals in the total time:

$$2TOF = TDT - TD2 - LED2 - TD1 - LED1.$$

The measured range is then half of the 2TOF based on the speed of light R=C*TOF.

Typically, the system timing may be based on a frame time controlled by a low jitter clock. Reply pulses 314 need not be sent immediately, but may be sent one or more frames later. Thus the delay TD2 can be positive, negative, or zero as effected in modulo frame time.

Further examples of round trip time of flight timing measurements may be found in the patent documents discussed in the UWB Basics section above.

Figure 4:
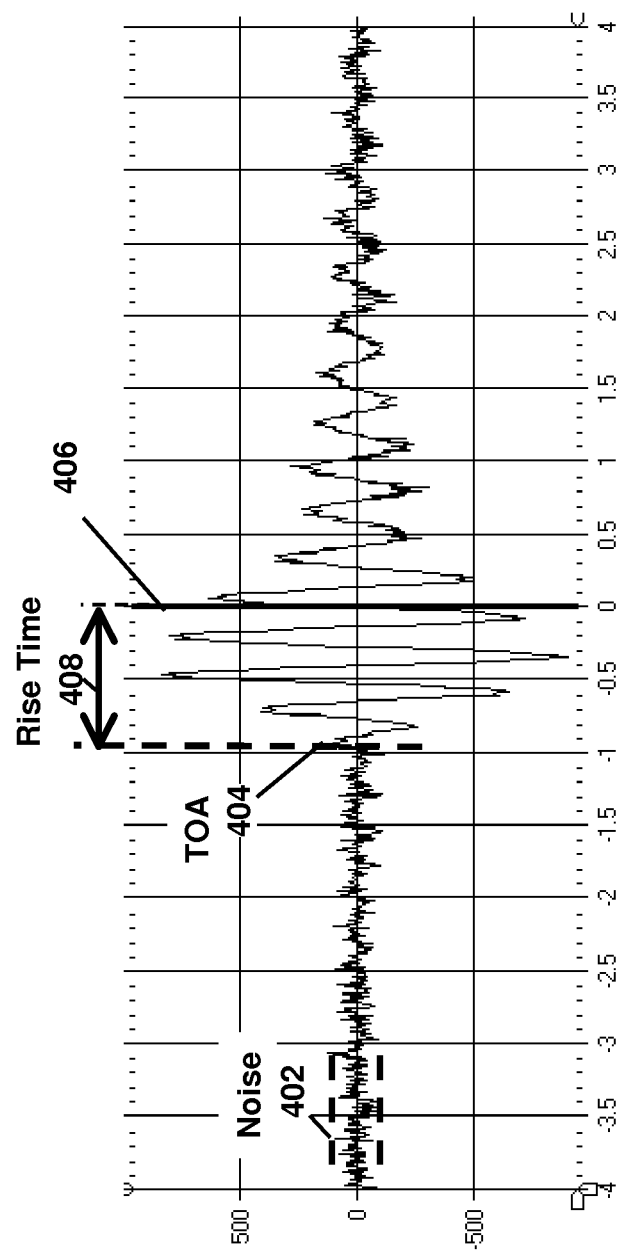
FIG. 4 illustrates an exemplary scan waveform with signal characteristics.

FIG. 4 illustrates an exemplary scan waveform with signal characteristics. FIG. 4 represents a scanning receiver pulse signature of the received waveform. The receiver locks onto the received pulse train at a reference lock point 406. A correlator samples the received waveform at various offset times relative to the lock point to generate the waveform of FIG. 4. Referring to FIG. 4, a typical scan includes an interval of channel noise at a channel noise level 402 as may be best determined by samples observed before the pulse arrives. A noise level 402 may also be useful in setting detection thresholds for leading edge detection. For example, in one embodiment, the leading edge time 404 (also referred to as time of arrival (TOA)) may be determined as the first crossing of a three sigma noise level, where sigma represents the RMS noise before the pulse arrives. A maximum peak may be determined from the waveform. An amplitude may be determined from the total energy in the waveform. Alternatively, a leading edge threshold may be determined as a ratio relative to the maximum peak, e.g., ¼ of the maximum peak. Various other leading edge techniques may be used. The leading edge offset 408 is the time difference between the leading edge point 404 and the lock point 406 on the waveform.

An additional useful quantity is the determination of a pulse envelope rise time. The pulse envelope rise time may be a measure of the time from the leading edge to the fully developed received pulse. A long rise time is indicative of a high multipath environment and/or a suppressed direct path signal. Conversely, a short pulse envelope rise time is indicative of a direct path clear line of sight environment. In one embodiment, the pulse envelope rise time may be determined as the time from the leading edge to the maximum peak value. Alternatively, the pulse envelope rise time may be the time from the leading edge to the lock point (see FIG. 4). In a further embodiment, the pulse envelope is first evaluated rectifying and filtering (or squaring and filtering) the pulse signature waveform and determining a rise time based on the filtered waveform, for example a 10% to 90% rise time based on the filtered waveform.

Figure 5:
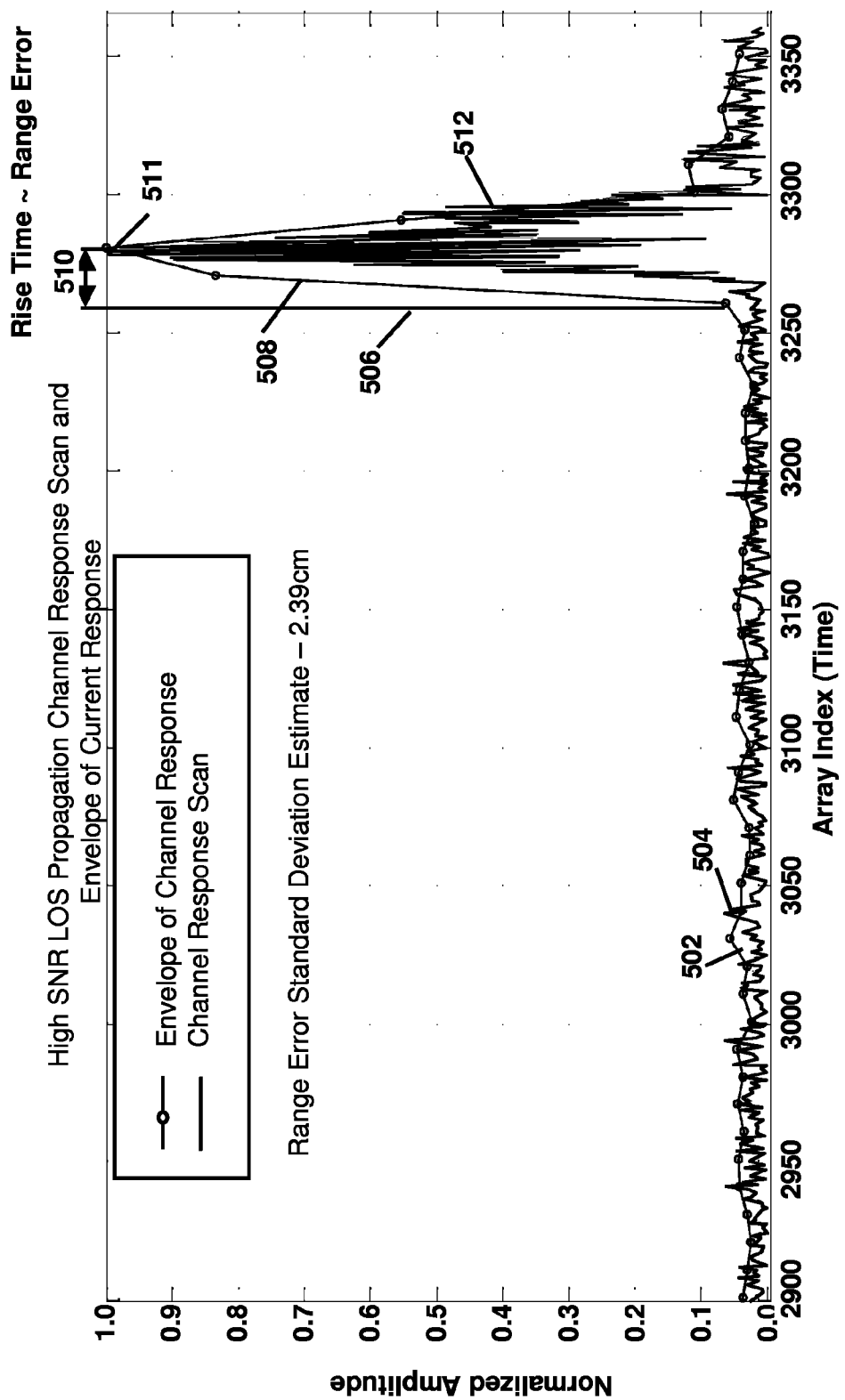
FIG. 5 illustrates an exemplary scan waveform envelope for a clear line of sight signal.

FIG. 5 illustrates an exemplary scan waveform envelope for a clear line of sight signal. Referring to FIG. 5, FIG. 5 shows a rectified (absolute value) scan signature waveform for a clear line of sight signal having very little multipath. The heavy line represents an envelope filter output 502, 508 from processing the rectified scan signature waveform 504, 512. The time scale shows the memory index value. Each memory index increment is about 60 picoseconds. The envelope filter may be any suitable filter known in the art, for example a moving average filter, an exponential moving average filter, a Butterworth filter, Kalman filter or other filter. The filter may be a smoothing filter acting on terms before and after a center reference point. One feature of the filter is to reduce responses to noise spikes.

Figure 6:
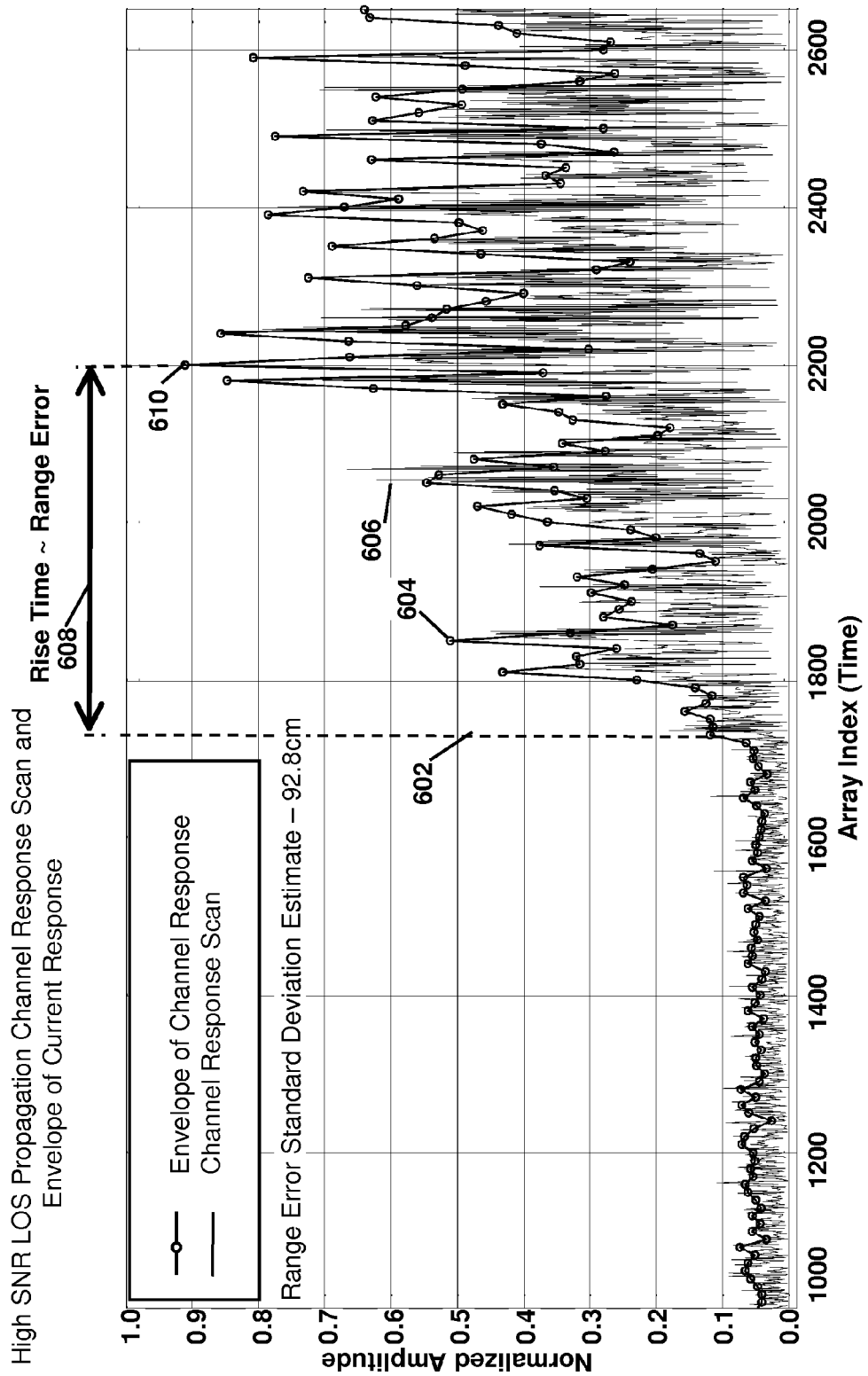
FIG. 6 illustrates an exemplary scan waveform envelope for a high multipath signal.

In FIG. 5, a period of noise is shown from index 2900 to about 3250. Note that the multipath envelope rise time interval 510 from the leading edge 506 to the peak envelope 511 is only two filter intervals. This results in a range error standard deviation estimate of 2.39 cm. The exemplary filter averages ten peak values in front of the value plotted in the figure. FIG. 6 shows a high multipath signal with a much longer rise time interval.

FIG. 6 illustrates an exemplary scan waveform envelope for a high multipath signal. Referring to FIG. 6, FIG. 6 shows a rectified scan signature waveform for a clear line of sight signal having heavy multipath, such as an indoor environment. The heavy line 604 represents an envelope filter output from processing the rectified scan signature waveform 606. Note that the rise time distance 608 from the leading edge 602 to the peak 610 is about 46 filter intervals. This results in a range error standard deviation estimate of 92.8 cm.

FIG. 5 and FIG. 6 illustrate various characteristics that may be used for determining the general quality of the link and the types of disturbances present in the environment. In particular, the slope of the rising portion of the pulse envelope is indicative of the level of multipath in the environment. A high multipath environment can obscure the leading edge or create a complex leading edge signal that is difficult to interpret and thus subject to greater error. The inventors have found that a measure of the rising portion of the pulse envelope is a valuable indicator of range measurement quality and can be related to an estimate of likely measurement error variance.

Various characteristics of the slope region may be calculated, e.g.,
1) the time interval from the leading edge to the peak,
2) the slope of a line from the leading edge to the peak,
3) the ratio of the peak signal to the noise measured before the leading edge,
4) total integrated pulse energy.

The signal strength may also be used as an indicator of link quality. Given a fixed or known transmitted signal strength, the received signal strength may be related to a distance based on a link propagation model. Since distance is measured by timing, the actual received strength may be used to determine a likely propagation model. Thus, a weak signal may indicate path attenuation through walls or foliage or an entirely blocked direct path. With the addition of high multipath information determined as a result of finding a long pulse envelope slope, the cues may favor an indoor environment propagation model.

Figure 7:
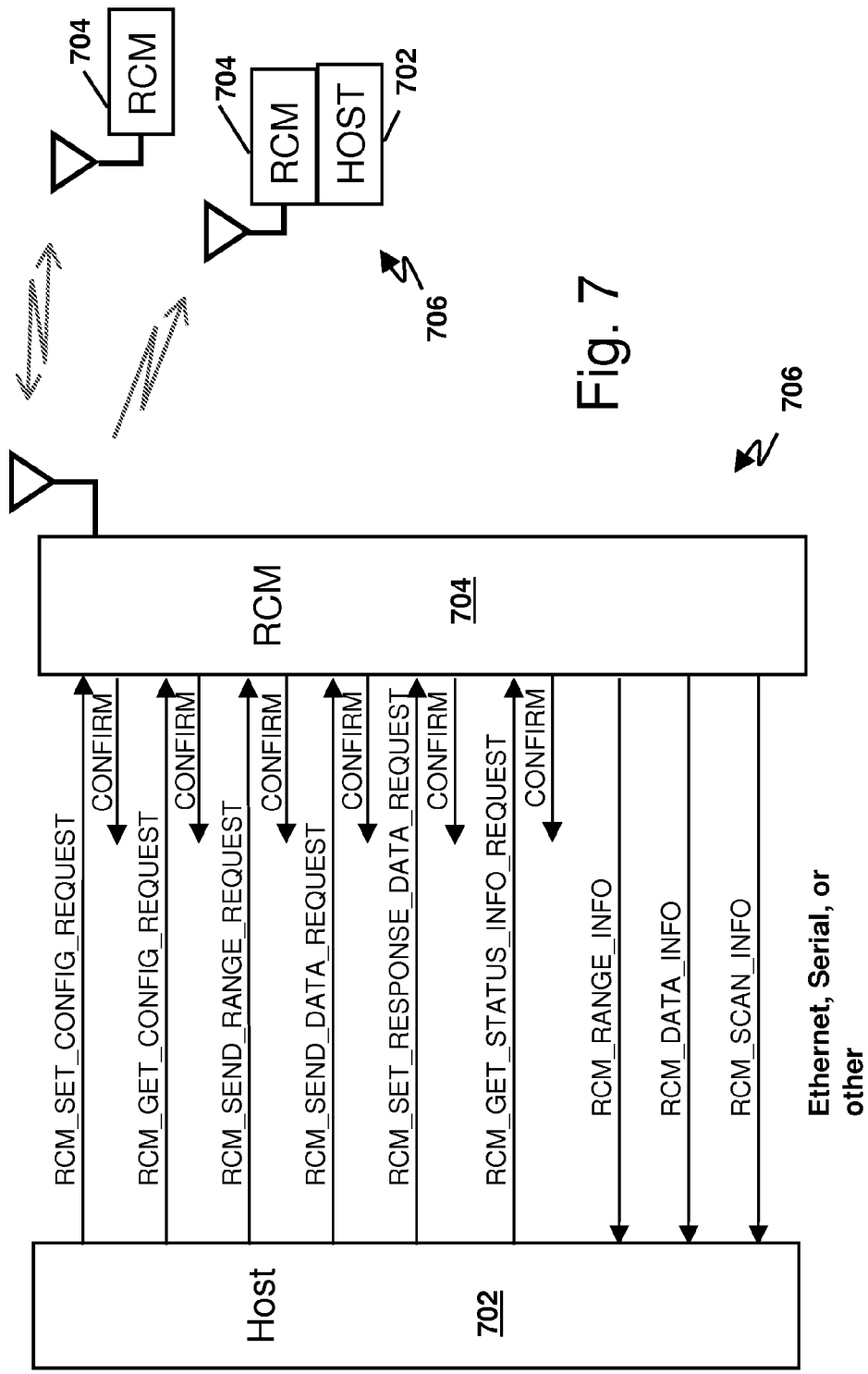
FIG. 7 illustrates an exemplary protocol including range measurement and range information.

FIG. 7 illustrates an exemplary protocol including range measurement and range information. FIG. 7 illustrates a Host 702 in communication with a range communication module (RCM) 704. Ethernet or serial are shown. Any communication protocol may be used. Host and RCM may be a single system 706. A Host/RCM system may be in communication with any number of other Host/RCM systems or single RCM devices.

Figure 8:
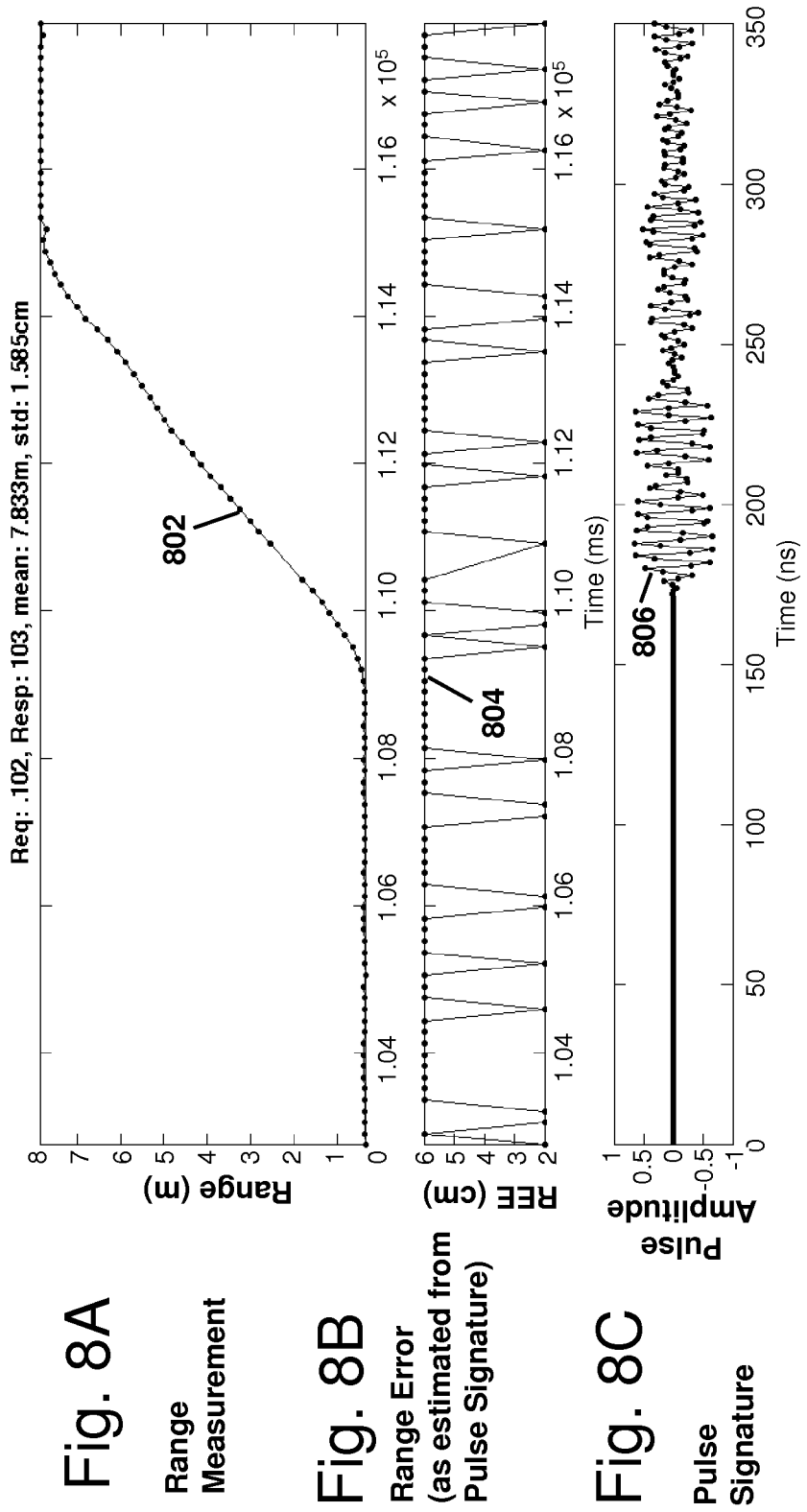
FIG. 8A-FIG. 8C illustrate exemplary range measurement, range error and pulse signature for a test case.

FIG. 8A-FIG. 8C illustrate exemplary range measurement, range error and pulse signature for a test case. FIG. 8A shows a range measurement 802 for two devices being moved from a reference (zero) to 8 meters separation. FIG. 8B shows a range error estimate 804 during this time. The range error estimate alternates between a determination of 2 cm and 6 cm, either one typical for a line of sight link. FIG. 8C shows an exemplary pulse amplitude signature waveform 806 for this test.

Figure 9:
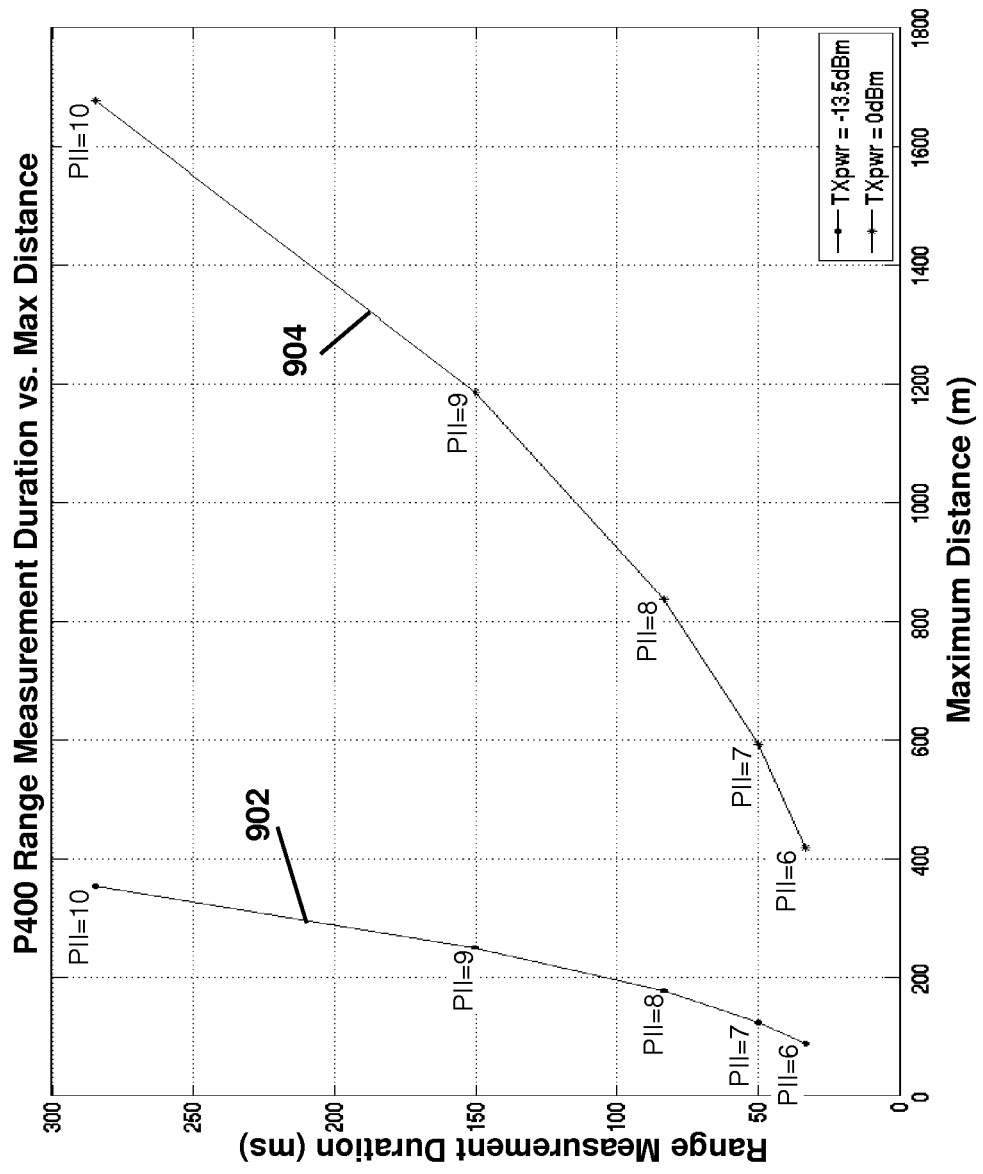
FIG. 9 illustrates distance and measurement time for two transmit power levels.

FIG. 9 illustrates distance and measurement time for two transmit power levels. Plot 902 is for −13.5 dBm average transmit power and plot 904 is for zero dBm average transmit power. PII is pulse integration index, i.e., the index of a power of two for the number of pulses integrated for a data bit, e.g., PII=6 is $2^6$=64 pulse integration. Acquisition may use additional integration by, for example, one index value, e.g. PII=6 for data and PII=7 for acquisition. Also, the scan data may be acquired with additional integration, for example one additional index value, as used for acquisition.

In one embodiment of the invention, the signal measurement time may be increased to improve the signal to noise and improve the measurement quality. By having a signal quality measurement, the system may dynamically adjust the measurement time to achieve a predetermined measurement quality or error variance. FIG. 9 illustrates the range measurement duration required for various distances and for two power levels.

Figure 10:
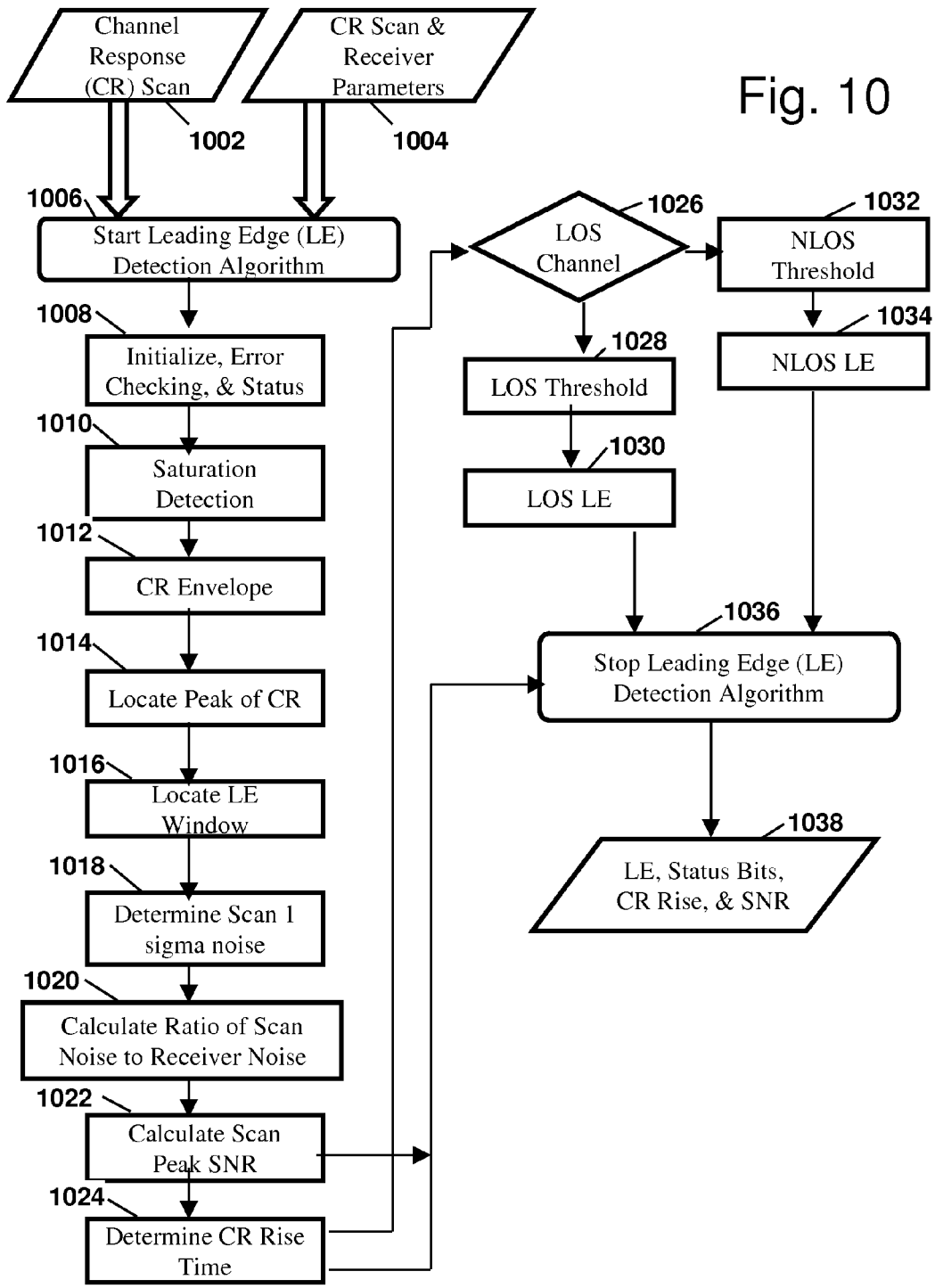
FIG. 10 is a block diagram of an exemplary leading edge detection process in accordance with the present invention.

FIG. 10 is a block diagram of an exemplary leading edge detection process in accordance with the present invention. Referring to FIG. 10, leading edge detection 1006 begins after producing a channel response scan 1002. The inputs include the channel response scan data and receiver parameters 1004. After software initialization 1008, the process begins with saturation detection 1010. Saturation may result when the link is short and with a clear line of sight. Saturation can also result when several multipath reflections sum together at the same time offset value, potentially resulting in a stronger signal than the direct path signal. Saturated signals may be determined as a signal greater than a predetermined threshold.

The channel response envelope is then determined 1012.

The peak magnitude response is then located 1014.

A leading edge window is then located 1016. The leading edge window is a sub region of the scan in which the leading edge is to be found. The leading edge window will be processed by the final step of the leading edge process. The leading edge window is found.

Scan noise is determined 1016 by measuring the noise in front of the leading edge window. An RMS signal value is determined for an interval of time prior to the leading edge window. The noise is the RMS value (1 sigma) or noise variance is RMS value squared.

Receiver noise is then determined 1020 and the ratio of scan noise to receiver noise is determined.

Peak SNR is then determined 1022 as, for example, the ratio of peak signal to 1 sigma noise. Other measures or criteria may be used.

Next, channel response rise time is determined 1024. Channel response rise time is the time from the leading edge time to the peak response. Other criteria may be used as previously discussed.

The channel type (line of sight (LOS) channel 1026 vs. non-line of sight (NLOS) 1032) is then determined based on the channel response rise time and other parameters.

In one embodiment, a non line of sight channel may be determined by one or more of:

1) envelope rise time greater than a predetermined threshold; and/or
2) signal amplitude less than a predetermined fraction of free space amplitude based on distance measured by delay time.

If the channel is determined to be a LOS channel, then a LOS threshold routine 1028 is invoked and a LOS leading edge routine is invoked 1030. If the channel is NLOS, then NLOS threshold and leading edge routines are invoked 1034. The leading edge detection is then exited 1036, returning the results to the calling routine 1038.

If during the determination of scan peak SNR or CR rise time, the SNR is found to be too low, i.e., below a predetermined threshold, or rise time is found to be too long, i.e., greater than a predetermined threshold, then the leading edge routine is exited, returning results indicating invalid data. The results may further be reported as an invalid range measurement status.

FIG. 11 is a block diagram of an exemplary error sigma process in accordance with the present invention. Referring to FIG. 11, upon entry into the range error sigma estimator the leading edge process of FIG. 10 will have been completed and envelope rise time, SNR and leading edge will have been computed. The various computed variables 1102, 1104 are passed to the range error sigma estimator.

The routine initializes 1106. The first step 1108 after initialization checks status bits for LED failure (leading edge detection failure) or low SNR. If so, set range status bit 1110 to indicate bad range and range error sigma to infinite.

The next step 1112 checks for a mixture of LOS and NLOS propagation paths.

If so status bits are set, range error is then estimated 1114 based on SNR and/or envelope rise data in accordance with the status bits.

The next step 1116 checks for a primarily LOS propagation path.

If so status bits are set, range error is then estimated 1114 based on SNR and/or envelope rise data in accordance with the status bits.

The next step 1118 checks for a primarily non line of sight (NLOS) propagation path.

If so status bits are set, range error is then estimated 1114 based on SNR and/or envelope rise data in accordance with the status bits.

When complete 1120, the error sigma routine returns the range status bit and error sigma value 1122.

Range Error Variance Data and Model Calibration

Figure 12A:
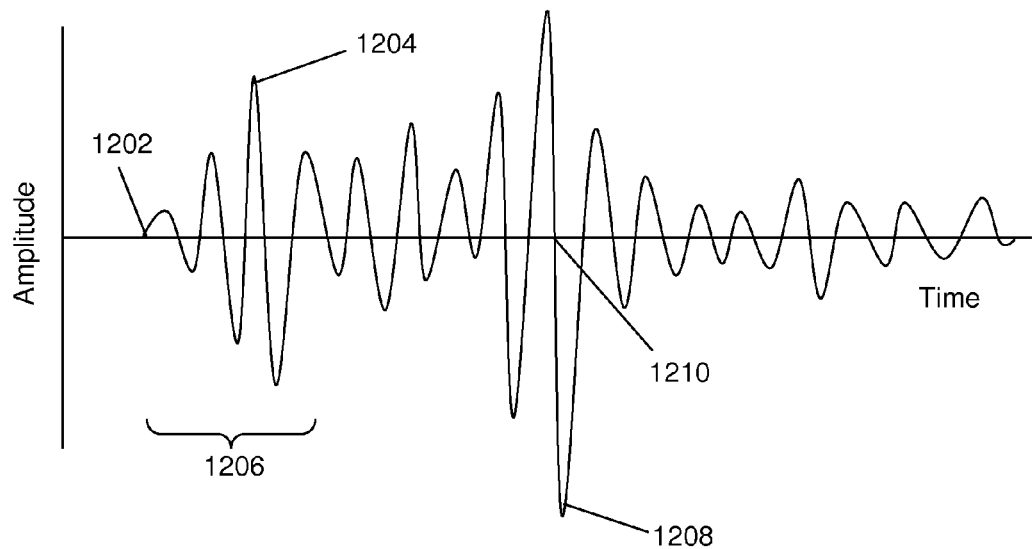
FIG. 12A and FIG. 12B depict a typical received waveform for a transmitted UWB pulse in a multipath environment.
Figure 12B:
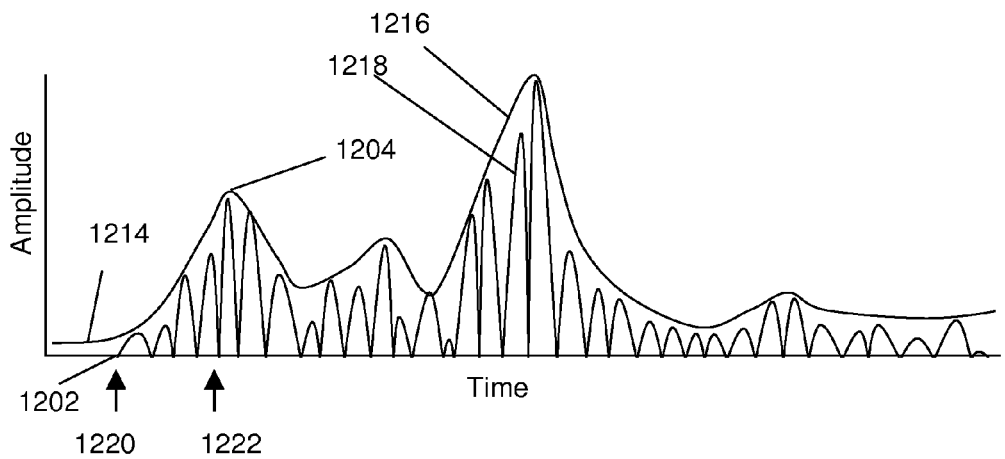

FIG. 12A and FIG. 12B depict a typical received waveform for a transmitted UWB pulse in a multipath environment. The waveform of FIG. 12A may be obtained by a scanning receiver scanning an offset time window around a lock point on a repetitive pulse signal. Referring to FIG. 12A, the received waveform begins at a leading edge 1202, where the received pulse first exceeds a background noise level. More particularly, where the signal rises above a threshold related to the background noise level, for example +3 dB above the background noise level. A direct path window 1206 comprises a first interval of time for evaluation of the leading edge slope. A direct path window width is determined based on the width of a single transmitted pulse, for example 3 dB power width. Point 1204 Vdpmax is a maximum amplitude (absolute value) (peak) within the direct path window.

Point 1210 is a zero crossing at a lock point Tlock. The receiver may lock on any cycle of the waveform, preferably a maximum amplitude wavelet, for example Vmaxtotal 1208. Vmaxtotal 1208 may result from the summation of multiple reflections to achieve a maximum amplitude greater than the peak direct path Vdpmax 1206.

FIG. 12B depicts a rectified signal 1218 (absolute value) of the signal of FIG. 12A along with a filtered signal 1216 that follows the envelope of the absolute value signal 1218. A leading edge time (Tle) 1220 is shown as the time of the leading edge 1202. A direct path peak time 1222 is shown as the time of the direct path peak 1204. Accordingly, a leading edge slope (Sle) may be defined:

$$Sle=(Vdp\max-V\text{noise})/(Tdp\max-Tle)$$

A direct path signal to noise may be defined:

$$SNRdp=Vdp\max{}^{**}2/2V\text{noise}$$

Where Vnoise is the variance of the noise in a noise window before the Tle, for example a window 25 samples before Tle.

Saturation

Figure 13A:
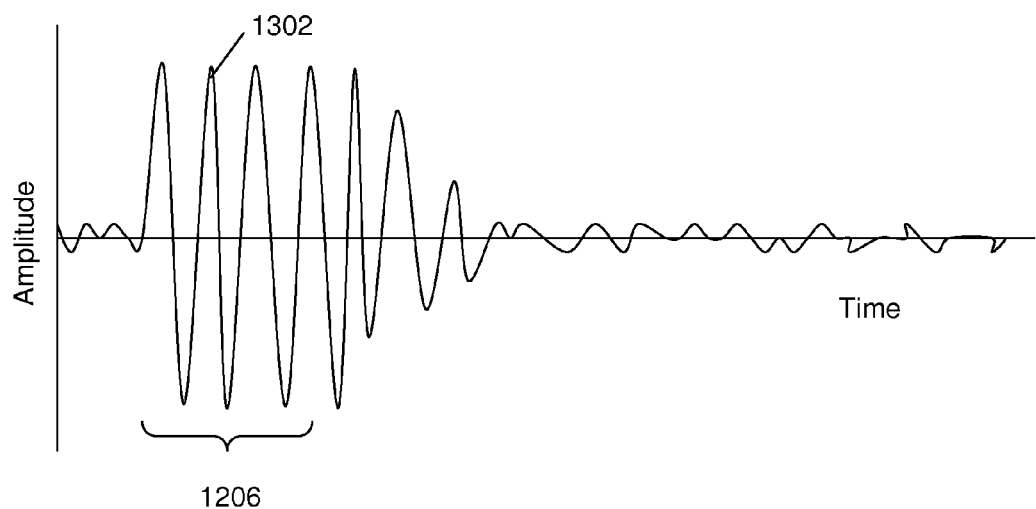
FIG. 13A and FIG. 13B depict a typical saturated signal as received by a UWB receiver.
Figure 13B:
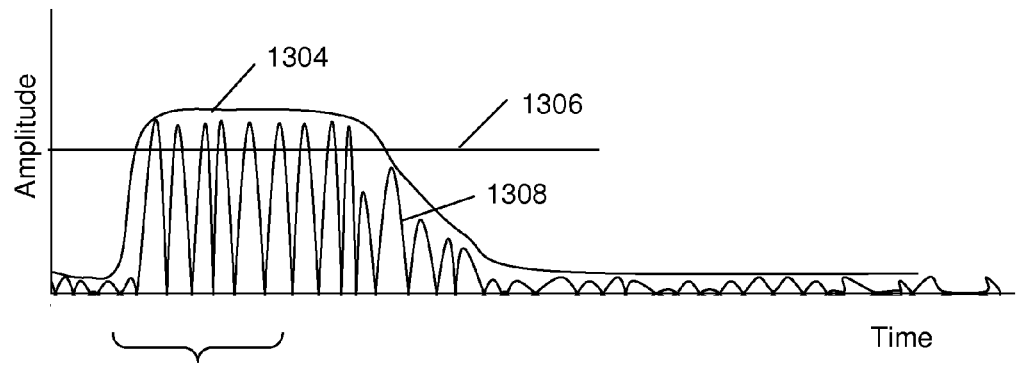

FIG. 13A and FIG. 13B depict a typical saturated signal as received by a UWB receiver. Referring to FIG. 13A, a saturated signal often results from a direct path close range signal and often has little multipath. A saturated signal 1302 may have several cycles of nearly constant maximum amplitude. A saturated signal may be determined by establishing a predetermined threshold Vsat and evaluating the signal relative to Vsat. Where the signal in the direct path window achieves a level above a Vsat threshold and stays above the Vsat threshold, the signal is considered to be saturated. Vsat may be determined by:

$$Vsat=ADC\max{}^*\text{Integration}^*Sat\text{Ratio}.$$

where,

ADCmax is the maximum value of the ADC (saturated value)
Integration is the integration applied to the ADC to achieve the signal.

SatRatio is a value applied to account for variations, for example, 0.8.
SatFlag is a variable indicating a saturated signal. SatFlag is set to True if the average of the signal (Vscan) within the direct path window (Dpwindow) is greater than Vsat:

$$SatFlag=mean(Vscan(DPwindow))>Vsat$$

Referring to FIG. 13B, the saturated signal is rectified to give signal 1308 and a filtered envelope is calculated 1304. It can be seen that the envelope signal 1306 exceeds the saturation threshold, Vsat 1306 during the direct path interval 1206 and maintains the level above the saturation threshold for the remainder of the direct path interval.

Rise Time

Rise time may be used to determine if the signal is a line of sight signal or non-line of sight signal.

$$RiseTime=Tdpmax-Tle$$

Line of sight may be determined as follows:
RiseTimeLOS=<500 ps
RiseTimeNLOS>500 ps The threshold (500 ps) may be determined by empirical measurements and observations in candidate environments.

Channel

Delay spread is a channel characterization that the inventors have found useful for estimation of distance error. Delay spread may be measured as the time from the direct path peak, Tdppeak to the last peak above a predefined threshold, for example 3 dB above the noise level. This time may be called Tlastpeak.
Thus:

$$Delay\ spread=Tlastpeak-Tdppeak$$

Delay spread energy may be may be determined as the total energy in the delay spread interval:

$$EnergyDS=Sum(abs(scan(Tdppeak:Tlastpeak)))$$

Determination of Range Error Estimate

Range error may be modeled as a zero mean variance on the range measurement. Once the signal is characterized, the range error may be estimated as follows:
A range error estimate may be expressed as a standard deviation, $\sigma_r$, or variance $\sigma_r^2$.

$$VarEst(range)=\sigma_r^2$$

Where VarEst( ) is a function returning the estimated variance, and
Range is the range measurement.
For SNRdp>10 dB the following table may be used:

| Rise Time (RT) | Range Error σ |
|---|---|
| RT < 500 ps | 2.2 cm |
| 500 ps < RT < 1 ns | 5.3 cm |
| 1 ns < RT < 2 ns | 20 cm |
| 2 ns < RT < 4 ns | 50 cm |
| 4 ns < RT < 10 ns | 1 m |
| 10 ns < Rt | 5 m |

The above exemplary table was derived using a specific receiver/transmitter in a variety of environments including indoor and outdoor environments.

In an alternative embodiment, the range error may be determined by interpolating, for example linearly interpolating, between values in the table above.

In an alternative embodiment, the range error may be estimated as a function of the rise time:

$$Range\ Error=RT*Rtfactor$$

Or, alternatively $$Range\ Error=RT^N*Rtfactor,$$

where Rtfactor and N are empirically derived. For example Rtfactor and N may be derived from the table above.

Additional Considerations

The SNR of the link may be determined separately for each direction. If the SNR of one direction differs from the other direction by some value, for example, 10 dB, then the range error estimate is increased. The discrepancy may indicate that one link locked to a large reflection at a great distance from the other link, such as a large reflection from the side of a building. Thus, the measurement may have considerable error.

Signal Correlation

In a further variation, a correlation coefficient may be used to determine range error variance. The channel is first sampled to produce a scan waveform. The scan waveform is then correlated with an ideal channel model. The degree to which the peak correlation is ideal can be used to determine a likely range error variance. Low signal strength (and resulting high noise) as well as high multipath will tend to reduce correlation. Experimental tests may be used to gather data for a particular radio design and expected range of environment to find the statistical relationship that defines the expected range error variance with a given correlation coefficient. In a further variation, various ideal channel models may be used.

CONCLUSION

One should understand that numerous variations may be made by one skilled in the art based on the teachings herein.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for determining a distance using a distance measuring system comprising a first transceiver and a second transceiver, said method comprising:
    said distance measuring system determining said distance between said first transceiver and said second transceiver based on round trip communication delay time between said first transceiver and said second transceiver;
    said distance measuring system determining a channel classification; wherein the channel classification comprises saturated or not saturated; wherein the cannel classification is not saturated, and a further type category is determined to be line of sight or non-line of sight;

said distance measuring system determining a leading edge offset value; and said distance measuring system determining a distance error variance for said distance based on said channel classification and said leading edge offset value;

said distance measuring system determining a channel noise level and a scan peak value;

said distance measuring system determining a scan peak signal to noise value based on said channel noise level and said scan peak value; and said distance measuring system determining a distance measurement quality factor based on said scan peak signal to noise value being less than a predetermined threshold.

2. The method as recited in claim 1, wherein the channel classification comprises line of sight and the distance error variance determination includes multipath envelope rise time.

3. The method as recited in claim 1, wherein the channel classification comprises line of sight and the distance error variance determination includes signal to noise.

4. A method for determining a distance using a distance measuring system comprising a first transceiver and a second transceiver, said method comprising:

said distance measuring system determining said distance between said first transceiver and said second transceiver based on round trip communication delay time between said first transceiver and said second transceiver;

said distance measuring system determining a channel classification; wherein the channel classification comprises saturated or not saturated; wherein the cannel classification is not saturated, and a further type category is determined to be line of sight or non-line of sight;

said distance measuring system determining a leading edge offset value; and said distance measuring system determining a distance error variance for said distance based on said channel classification and said leading edge offset value;

said distance error variance determination further including determining multipath envelope rise time;

wherein the step of determining said multipath envelope rise time comprises:

said distance measuring system determining a leading edge time;

said distance measuring system determining a peak signal envelope time; and said distance measuring system determining said multipath envelope rise time based on a time difference between said leading edge time and said peak signal envelope time.

5. The method as recited in claim 4, wherein said step of determining said peak signal envelope time comprises:

determining a scan waveform of said signal;

rectifying said scan waveform to produce a rectified scan waveform;

filtering said rectified scan waveform to produce a multipath signal envelope waveform;

determining a time of a peak value of said multipath signal envelope waveform as said peak signal envelope time.

6. A method for determining a distance using a distance measuring system comprising a first transceiver and a second transceiver, said method comprising:

said distance measuring system determining said distance between said first transceiver and said second transceiver based on round trip communication delay time between said first transceiver and said second transceiver;

said distance measuring system determining a channel classification; wherein the channel classification comprises saturated or not saturated; wherein the cannel classification is not saturated, and a further type category is determined to be line of sight or non-line of sight;

said distance measuring system determining a leading edge offset value; and said distance measuring system determining a distance error variance for said distance based on said channel classification and said leading edge offset value;

said distance error variance determination further including determining multipath envelope rise time;

wherein the step of determining said multipath envelope rise time comprises:

said distance measuring system determining a leading edge time, said distance measuring system determining a lock point time; and said distance measuring system determining said multipath envelope rise time based on a time difference between said leading edge time and said lock point time.

7. A method for determining a distance using a distance measuring system comprising a first transceiver and a second transceiver, said method comprising:

said distance measuring system determining said distance between said first transceiver and said second transceiver based on round trip communication delay time between said first transceiver and said second transceiver;

said distance measuring system determining a channel classification; wherein the channel classification comprises saturated or not saturated; wherein the cannel classification is not saturated, and a further type category is determined to be line of sight or non-line of sight;

said distance measuring system determining a leading edge offset value; and said distance measuring system determining a distance error variance for said distance based on said channel classification and said leading edge offset value;

wherein the step of determining said distance error variance comprises:

said distance measuring system determining a multipath envelope rise time; and said distance measuring system determining said distance error variance as a constant times said multipath envelope rise time.

8. A method for determining a distance using a distance measuring system comprising a first transceiver and a second transceiver, said method comprising:

said distance measuring system determining said distance between said first transceiver and said second transceiver based on round trip communication delay time between said first transceiver and said second transceiver;

said distance measuring system determining a channel classification; wherein the channel classification comprises saturated or not saturated; wherein the cannel classification is not saturated, and a further type category is determined to be line of sight or non-line of sight;

said distance measuring system determining a leading edge offset value; and said distance measuring system determining a distance error variance for said distance based on said channel classification and said leading edge offset value;

wherein the step of determining said distance error variance comprises:

said distance measuring system determining a multipath envelope rise time; and said distance measuring system determining said distance error variance as a power function of said multipath envelope rise time.

9. A system for determining a distance, comprising:

a first transceiver configured to determine a round trip communication delay for communications with a second transceiver;

said second transceiver configured to cooperate with said first transceiver to determine said round trip communication delay;

a processor in communication with at least one of said first transceiver and said second transceiver, said processor configured to determine a distance based on said round trip communication delay;

said processor configured to determine a channel classification for a communication channel associated with said communications with said second transceiver; and said processor configured to determine a leading edge offset value; and said processor configured to determine a distance error variance for said distance based on said channel classification and said leading edge offset value;

wherein said processor is further configured to determine a multipath envelope rise time based at least in part on said leading edge offset value and said distance error variance is further based on said multipath envelope rise time.

10. The system in accordance with claim 9, wherein said channel classification is line of sight.

11. The system in accordance with claim 9, wherein said distance error variance is further based on signal to noise.

\* \* \* \* \*